(12) United States Patent
Iteya et al.

(10) Patent No.: US 7,446,444 B2
(45) Date of Patent: Nov. 4, 2008

(54) GENERATOR HUB ADAPTER

(75) Inventors: Yoshihide Iteya, Osaka (JP); Kazuki Tanaka, Osaka (JP)

(73) Assignee: Shimano Inc., Osaka (JP)

( * ) Notice: Subject to any disclaimer, the term of this patent is extended or adjusted under 35 U.S.C. 154(b) by 351 days.

(21) Appl. No.: 11/185,016

(22) Filed: Jul. 20, 2005

(65) Prior Publication Data

US 2006/0163961 A1 Jul. 27, 2006

(30) Foreign Application Priority Data

Jan. 24, 2005 (JP) ............... 2005-016112

(51) Int. Cl.
*H02K 7/10* (2006.01)
(52) U.S. Cl. ...................... 310/75 C; 310/71
(58) Field of Classification Search ............... 310/75 C, 310/67 A, 71
See application file for complete search history.

(56) References Cited

U.S. PATENT DOCUMENTS 5,828,145 A * 10/1998 Nakamura ............... 310/67 A

| | | | | |
|---|---|---|---|---|
| 6,409,197 B1 * | 6/2002 | Endo et al. | ............... | 280/288.4 |
| 6,605,884 B2 * | 8/2003 | Nishimoto | ............... | 310/67 A |
| 7,288,865 B2 * | 10/2007 | Tanaka et al. | ............ | 310/67 A |

FOREIGN PATENT DOCUMENTS

| EP | 1 491 433 A1 | 12/2004 |
|---|---|---|
| JP | 09-132186 A | 5/1997 |
| JP | 09-142352 A | 6/1997 |
| JP | 09-286365 A | 11/1997 |
| JP | 2001-080558 A | 3/2001 |
| JP | 2004-299418 | * 10/2004 |
| JP | 2004-299418 A | 10/2004 |

* cited by examiner

*Primary Examiner*—Nguyen N Hanh
(74) *Attorney, Agent, or Firm*—Global IP Counselors, LLP

(57) ABSTRACT

A generator hub adapter is disclosed that is for use on a bicycle generator hub. The generator hub adaptor includes a mounting portion and a contact terminal. The mounting portion has a contact surface dimensioned and arranged to contact an axial outer face of a nut member of the generator hub. The mounting portion is electrically connectable to the nut member and easily mounted on a hub axle supporting the generator hub. The contact terminal is formed integrally with the mounting portion and provides a simple means for completing an electrical circuit without modification to a bicycle frame or the generator hub.

13 Claims, 8 Drawing Sheets

GENERATOR HUB ADAPTER

CROSS-REFERENCE TO RELATED APPLICATIONS

This application claims priority to Japanese Patent Application No. 2005-016112, filed Jan. 24, 2005. The entire disclosure of Japanese Patent Application No. 2005-016112 is hereby incorporated herein by reference.

BACKGROUND OF THE INVENTION

1. Field of the Invention

The present invention relates to an electrical adapter, and more particularly relates to a generator hub adapter that is used with a bicycle generator hub, the bicycle generator hub including a hub axle, a stator portion of a generator mounted on the hub axle, a connector that is also held by a nut member to the hub axle, the connector being provided with a first contact terminal that is electrically connected to the stator portion of the generator, with the electrical adaptor also being supported on the hub axle and being electrically connected to a rotor portion of the generator.

2. Background Information

Bicycle generator hubs are well known. In such bicycle generator hubs, a stator portion of a generator is mounted within a hub located at the center of one of the bicycle wheels. The bicycle generator hub includes a hub axle, a stator portion of the generator and a connector. The stator portion of the generator is typically fixed or non-rotatably mounted to the hub axle. The stator portion is further electrically connected to a contact within the connector. The connector is preferably fixed by a nut member to the hub axle. The connector is typically an insulated member that includes the contact to allow for easy attachment of power supply wires from electrical devices such as a headlamp installed on a bicycle. In the past, the connector was mounted to the hub axle alongside the stator of the generator, and electrical wiring for connecting to the electrical device was connected to the contact of the connector (for example, see Japanese Laid-Open Patent Application 2004-299418). These connectors are known to come in a one-wire configuration having just a first contact terminal electrically connected via internal wiring to the stator of the generator. A rotor of the generator is typically grounded to the frame of the bicycle. Therefore, the frame of the bicycle served as a portion of the generator wiring to complete the circuit for powering devices mounted on the bicycle.

A two-wire connector configuration having a first contact terminal electrically connected via internal wiring to one component of the generator, and a second contact terminal electrically connected via the hub axle to the other component of the generator is also known. In a two-wire connector configuration, the first contact terminal is generally the same as the one-wire configuration. The second contact terminal is achieved by attaching a second connector to the frame or hub axle, which is in electrical contact with the rotor of the generator.

A one-wire type of connector makes wiring work easier because only one wire is needed to power the electrical device with the frame providing a ground. Accordingly, this design is widely employed for ordinary bicycles used for commuting to work or school, running errands, and so forth. However, two-wire connector having two (first and second) contact terminals is becoming widely desired in some markets because newer frames may not easily provide electrical conductivity. For example, some frames are provided with thick paint finishes that must be scratched down to metal in order to electrical contact. Further, some frames are made of composite materials which are non-conductive. Bicycles using such frames being equipped with electrical devices other than headlamps, such power assisted shifting mechanisms that require electrical power.

The cost of producing two different designed hub generators, a one wire type and a two wire type, complicates manufacturing and makes each of the two types more expensive.

In view of the above, it will be apparent to those skilled in the art from this disclosure that there exists a need for an improved hub generator that is easily modified to change it to and from a one wire type to a two wire-type. This invention addresses this need in the art as well as other needs, which will become apparent to those skilled in the art from this disclosure.

SUMMARY OF THE INVENTION

One object of the present invention is to provide a bicycle with electric power that does not require the frame to be electrically conductive.

Another object of the present invention is to provide two electrical connectors to complete a circuit from a bicycle hub generator.

Another object of the present invention is to provide a bicycle hub generator with a simple design that can easily be installed on the bicycle for either a one wire or a two wire electrical connection configuration.

It is also an object of the present invention to provide a generator hub adapter with which a one-wire type of connector having only one contact terminal can be easily changed to a two-wire type of a connector having two contact terminals.

It is a further object of the present invention to provide a generator hub adapter with which, in changing a one-wire type of connector having only one contact terminal to a two-wire type of a connector having two contact terminals, the two contact terminals are aligned and adjacent to one another.

The foregoing objects can basically be attained by providing a bicycle hub generator with first and second contact terminal that do not rely on the bicycle frame for completing electrical circuits on the bicycle.

As discussed above, there are two types of connector used for generator hubs: a one-wire type having just one contact terminal where the frame completes a circuit, and a two-wire type having two contact terminals. The connector type needed for installation on the bicycle generator hub is determined by the specifications and intended application of the bicycle generator hub. In accordance with the present invention, a single bicycle generator hub configuration can be used for either a one wire or a two-wire type. The one wire type is easily modified in accordance with the present invention by the addition of an adaptor of the present invention. The adaptor of the present invention simplifies manufacturing costs because only a single hub generator configuration is manufactured and includes an optional adaptor of the present invention that turns the bicycle generator hub into a two wire connector.

In accordance with one aspect of the present invention, a generator hub adapter is used with a bicycle generator hub, where the bicycle generator hub includes a hub axle, a stator of a generator and a connector, the stator being mounted to the hub axle and electrically connected to a first contact terminal supported on the connector, the connector being fixed by a nut member to the hub axle, the adaptor including a mounting portion and a second contact terminal. The mounting portion of the adaptor is in contact with an axial outer face of the nut member and is electrically connected to and mounted on the hub axle. The second contact terminal is formed integrally with the mounting portion.

With the generator hub adapter of the present invention, when the connector is fixed to the hub axle by the nut member, the adapter is mounted to the hub axle in a state in which the mounting portion is in contact with the outer face of the nut member from the outside in the axial direction. As a result, the adapter and the hub axle are electrically connected via the nut member, with the nut member being threaded onto the hub axle and being at least partially covered by the adapter in the axial direction. The adapter is thereby electrically connected to a rotor of the generator. When an electrical wire is connected to the second contact terminal formed integrally on the mounting portion of the adaptor, a ground wire can be connected to the electrical device without having to use the frame of the bicycle. Since the adapter is disposed on an outer side of the nut member, the adapter having the second contact terminal can be mounted to the hub axle after the connector has been fixed to the hub axle. Accordingly, a second contact terminal can be easily added to the connector already fixed to the hub axle, where the connector has a first contact terminal. Therefore, the configuration of the generator hub can be easily changed to two contact terminal arrangement. This reduces the number of types of connectors necessary, and simplifies the manufacture of the connector and the assembly of the generator hub. Also, since an adapter may be added in the event that an electrical device requiring two contact terminals is subsequently added, retrofitting of an electrical device is easier.

In another aspect of the present invention, the generator hub adapter further includes a locking portion that is formed integrally with the mounting portion for fixed attachment to the hub axle. In this case, since the second contact terminal of the adapter can be positioned with respect to the first contact terminal, the positional relationship of the two contact terminals is fixed, and the wiring for two terminals is easier.

In another aspect of the present invention, the mounting portion of the generator hub adapter has a disk portion in contact with the nut member and equipped with a through hole through which the hub axle passes, and a cover portion that extends from the outer peripheral face of the disk portion toward the connector so as to allow coverage of the outer peripheral part of the nut member. In this case, since the mounting portion extends toward the connector so as to cover the nut member, the second contact terminal can be positioned close to the first contact terminal.

In yet another aspect of the present invention, the generator hub adapter is used for a bicycle generator hub that has a hub axle, a generator component mounted to the hub axle and electrically connected at a first end to the hub axle, and a connector fixed to the hub axle and provided with a first contact terminal to which a stator of the generator is electrically connected, the adaptor including a mounting portion, a locking portion, and a second contact terminal. The mounting portion is electrically connected and mounted to the hub axle. The locking portion is formed integrally with the mounting portion and is fixed in position with respect to the hub axle. The second contact terminal is formed integrally with the mounting portion.

With the above generator hub adapter, when the connector is fixed in position relative to the hub axle, the mounting portion is also fixed in position relative to the hub axle. As a result, the adapter and the hub axle are electrically connected, and the adapter is electrically connected to the rotor of the generator. When an electrical wire is connected to the second contact terminal formed integrally with the mounting portion, a ground wire can be connected to the electrical device without having to use the frame of the bicycle. Since the adapter is fixed with respect to the hub axle, the positional relationship between the first contact terminal and the second contact terminal on the adaptor is fixed. Therefore, in changing a connector having just one contact terminal to a connector having two contact terminals, the two contact terminals can be aligned, and the wiring for the two contact terminals can be more easily installed.

In accordance with another aspect of the present invention, the connector is fixed by a nut member that is mounted to the hub axle from an outer axial direction, and the mounting portion of the adaptor is disposed between the nut member and the connector. In this case, since the adapter is fixed along with the connector to the hub axle by the nut member, the adapter will remain with the connector even if the hub axle is removed from the frame.

In accordance with still another aspect of the present invention, the connector is non-rotatably mounted to the hub axle, and the locking portion of the adaptor includes a first locking portion that is non-rotatably engaged with the connector. In this case, since the adapter is locked with respect to the hub axle and is locked to the connector, it is less likely that the positional relationship of the two contact terminals will be disrupted. Also, the adapter can be elastically latched to the connector with the locking portion by using the first locking portion. In this case, the adapter will not readily come off the connector when the hub axle is removed from the frame even though the adapter is disposed to the outside of the nut member in the axial direction and is fixed to the hub axle by a nut or other such fixing means that fixes the hub axle.

In accordance with another aspect of the invention, the connector has a flat face that is parallel to the hub axle, and the first locking portion of the adaptor is bent or biased inward such that the first locking portion makes contact with the flat face. In this case, since the first locking portion is bent inward, a biasing force is applied to the flat face of the connector, thereby urging the adaptor to remain in place on the connector.

In accordance with still another aspect of the present invention, the second contact terminal of the adapter is aligned with the first contact terminal. In this case, since the two contact terminals are disposed lined up, it is easier to dispose the two electrical wires.

In accordance with still another aspect of the present invention, the distal end of the second contact terminal extends away from the first contact terminal. In this case, since the distal end of the second contact terminal extends in a direction angled away from the first contact terminal, the distal ends of the two contact terminals are farther apart, so even with the two contact terminals located closer together, they can each be readily distinguished during wiring, and it will be easier to attach electrical wires to the contact terminals.

With the present invention, since the adapter is disposed to the outside of the nut member in the axial direction, an adapter having a second contact terminal can be mounted to the hub axle after a first single connector has been fixed to the hub axle. Accordingly, a second contact terminal can be easily added to a connector that has been fixed to the hub axle, so a connector having just one contact terminal can be easily changed to a connector having two contact terminals. This reduces the number of types of connectors necessary, and simplifies the manufacture of the connector and the assembly of the generator hub. Also, since the adapter of the present invention may be added in the event that an electrical device requiring two contact terminals is subsequently added to the bicycle, retrofitting of an electrical device is easier.

In accordance with still another aspect of the present invention, since the adapter is locked with respect to the hub axle, the positional relationship of the first contact terminal, which is provided to the connector fixed to the hub axle, and the second contact terminal is fixed. Therefore, in changing a connector having just one contact terminal to a connector having two contact terminals, the two contact terminals can be aligned, and the wiring for the two contact terminals can be installed more easily.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
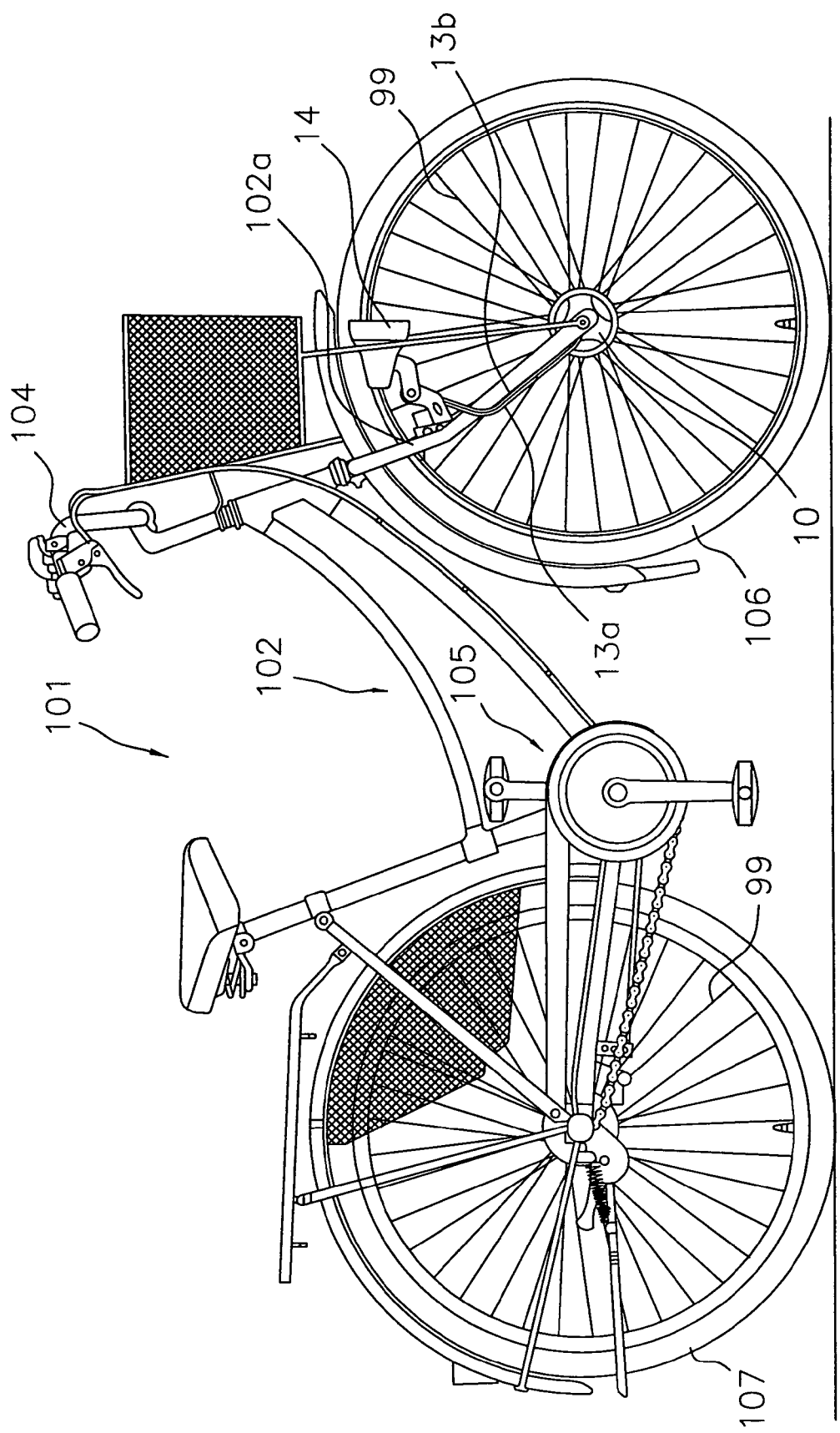
FIG. 1 is a side view of a bicycle that includes a generator hub in accordance with the present invention.

Referring initially to FIG. 1, a bicycle 101 is illustrated in accordance with a first embodiment of the present invention.

In FIG. 1, the bicycle 101 includes a frame 102 having a front fork 102a, a handlebar 104, a drive unit 105, a front wheel (also referred to merely as the wheel) 106 having spokes 109, and a rear wheel 107. The drive unit 105 includes a chain, pedals, and other conventional bicycle drive train components.

Figure 2:
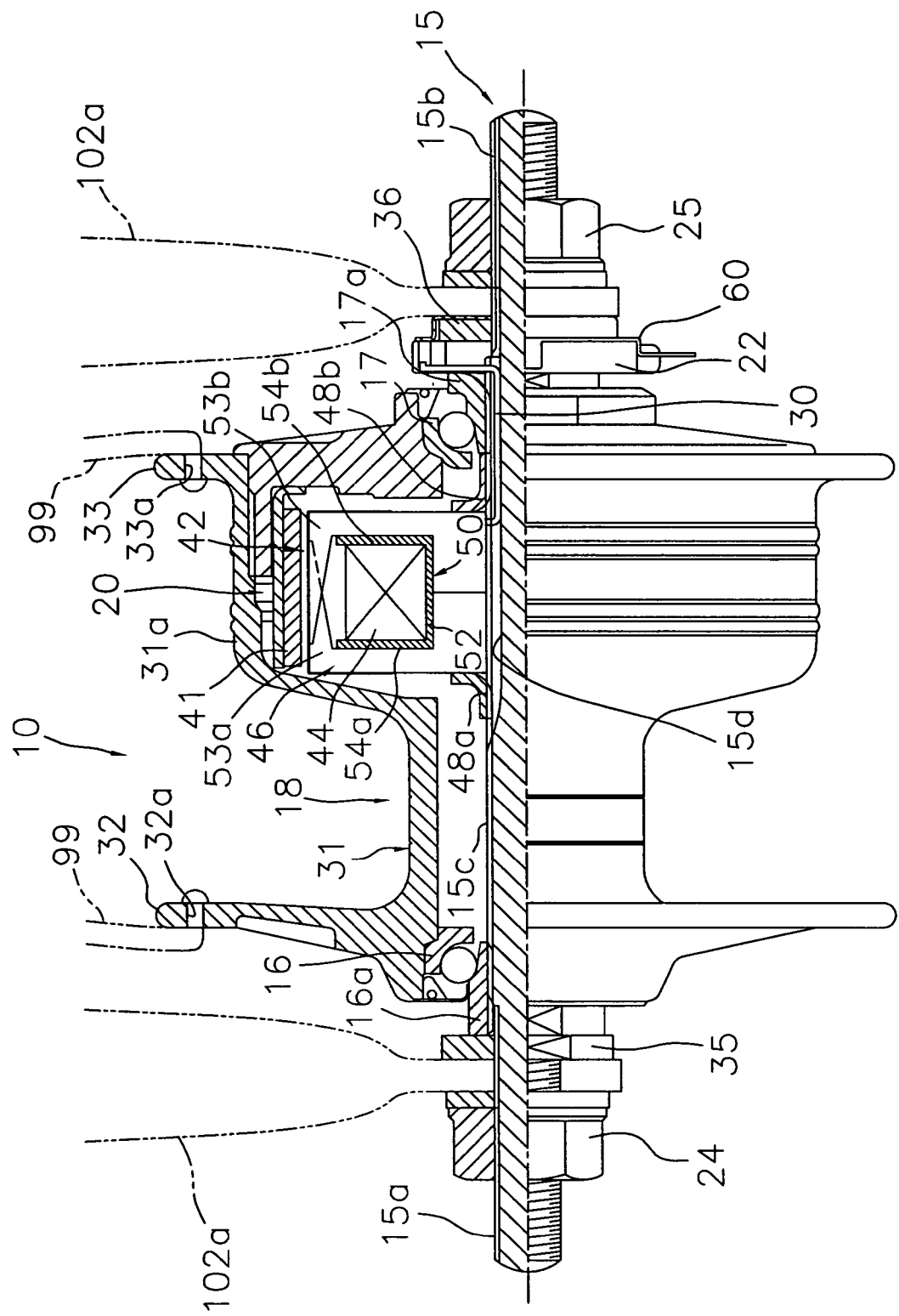
FIG. 2 is a partial cross section of the generator hub showing a rotor and stator of a generator, a connector and an adaptor in accordance with a first embodiment of the present invention.

As shown in FIG. 2, the front wheel 106 of the bicycle 101 is provided with a generator hub 10 and a terminal adapter 60 which serves as a generator hub adapter in accordance with one embodiment of the present invention. The generator hub 10 serves to generate electrical power that is transmitted through two wires, a power supply wire 13a and a ground wire 13b, to a headlamp 14 that can be equipped with, for example, a photosensor or a mechanical on/off switch.

Figure 3:
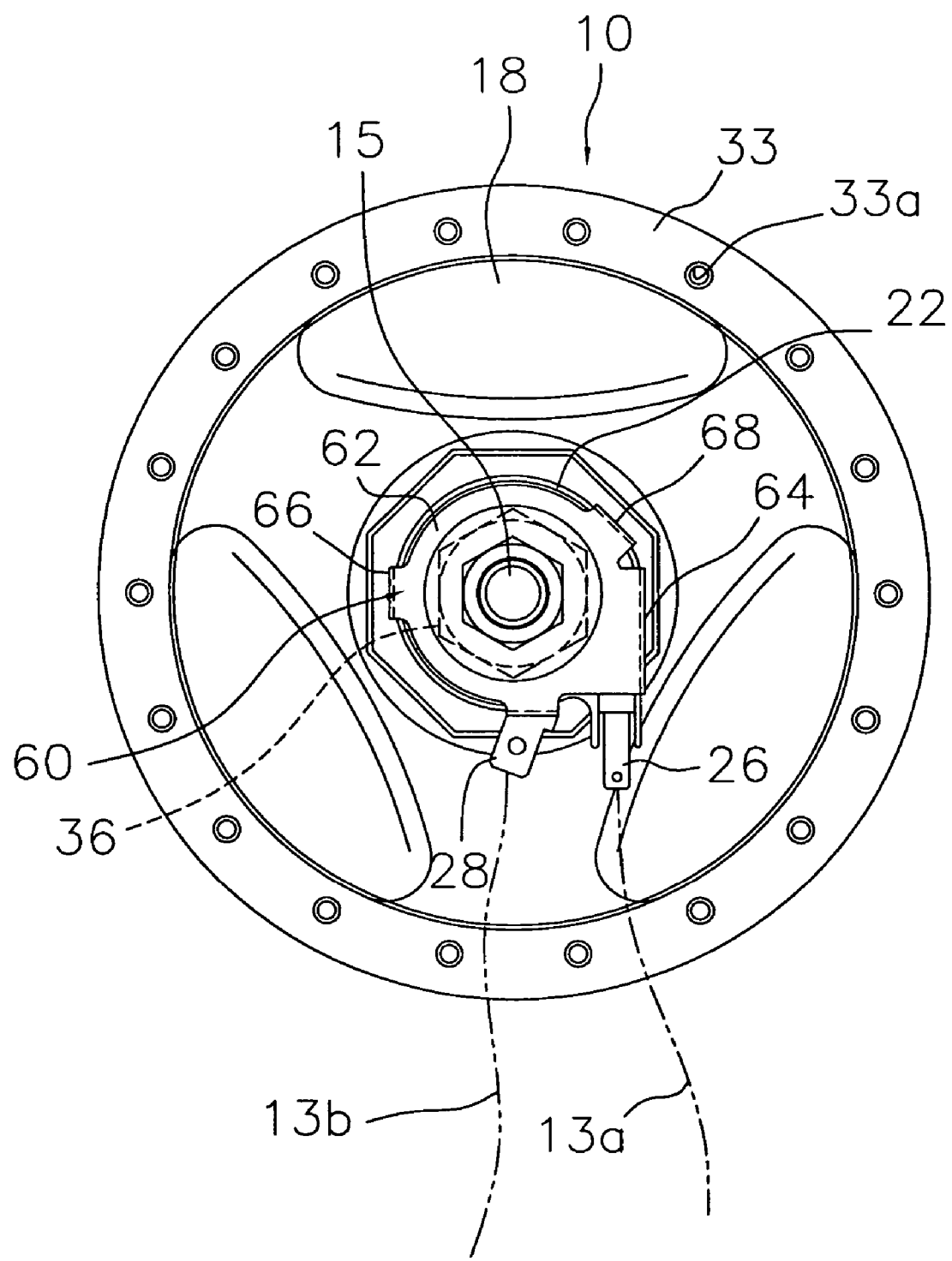
FIG. 3 is a side view of the generator hub in accordance with the first embodiment of the present invention.

The generator hub 10 shown in FIGS. 2 and 3 is mounted to the distal end of the front fork 102a along with the front wheel 106 of the bicycle. This generator hub 10 includes a hub axle 15, a hub shell 18, a generating mechanism 20 and a connector 22. The hub axle 15 is fixed at each end to the front fork 102a. The hub shell 18 is disposed about the outside of the hub axle 15 and is rotatably supported on the hub axle 15 by a pair of bearings 16 and 17. The generating mechanism 20 is disposed between the hub axle 15 and the hub shell 18. The connector 22 supplies power generated by the generating mechanism 20 to an external component such as the headlamp 14. A terminal adapter 60 is mounted on the connector 22.

Around the outer peripheral end portions of the hub axle 15 are formed first male threaded components 15a and 15b. A second male threaded component 15c is formed between the first male threaded components 15a and 15b and is larger in diameter than the first male threaded components 15a and 15b. The outer peripheral surface of the hub axle 15 is also formed with a wiring insertion groove 15d that extends from the area where the generating mechanism 20 is mounted to the end of the first male threaded component 15b. The wiring insertion groove 15d receives internal wiring 30 that connects the generating mechanism 20 and the connector 22.

Figure 4:
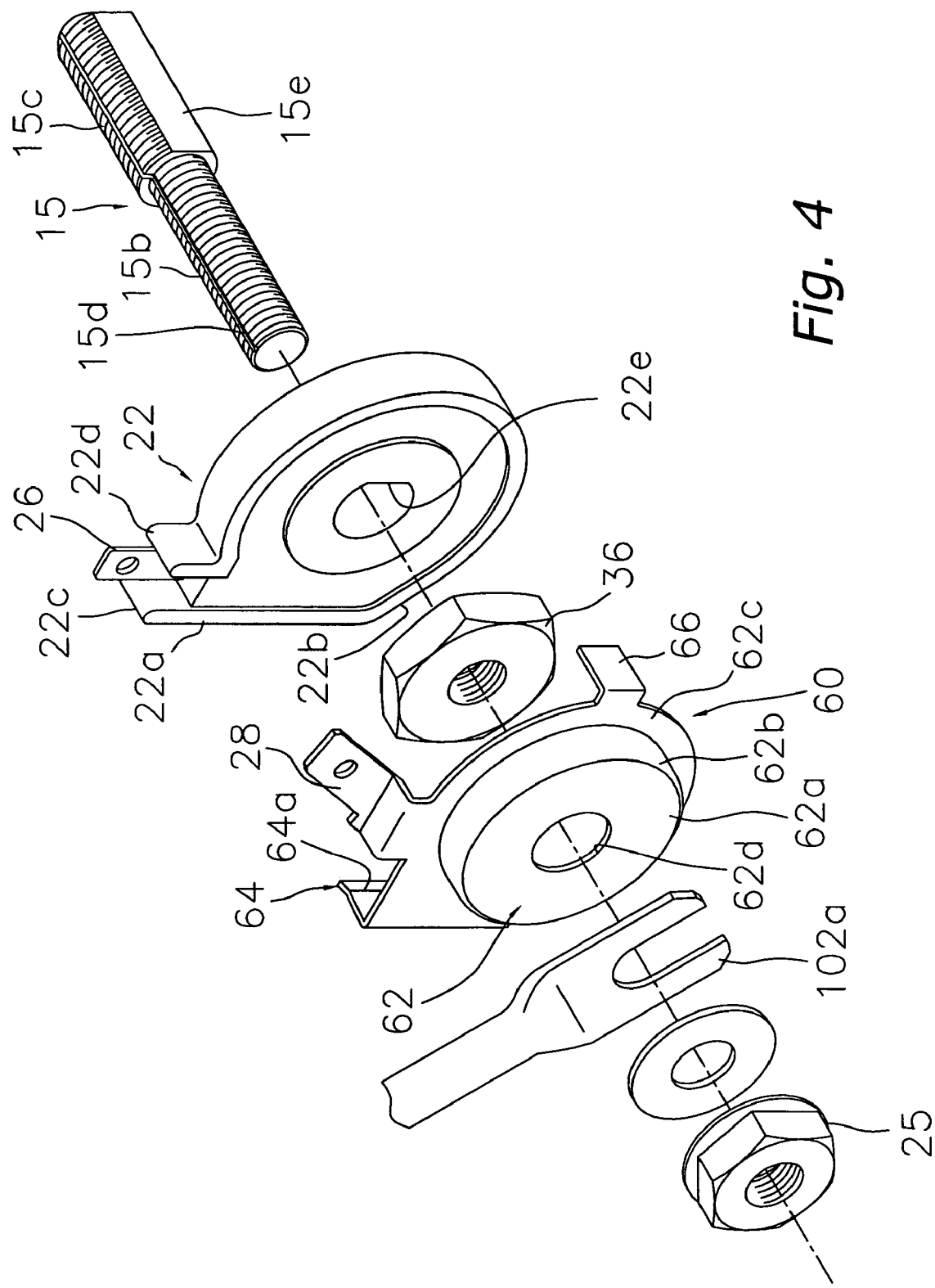
FIG. 4 is an exploded view of a portion of the hub generator showing a portion of a hub axel, the connector and the adapter in accordance with the first embodiment of the present invention.
Figure 5:
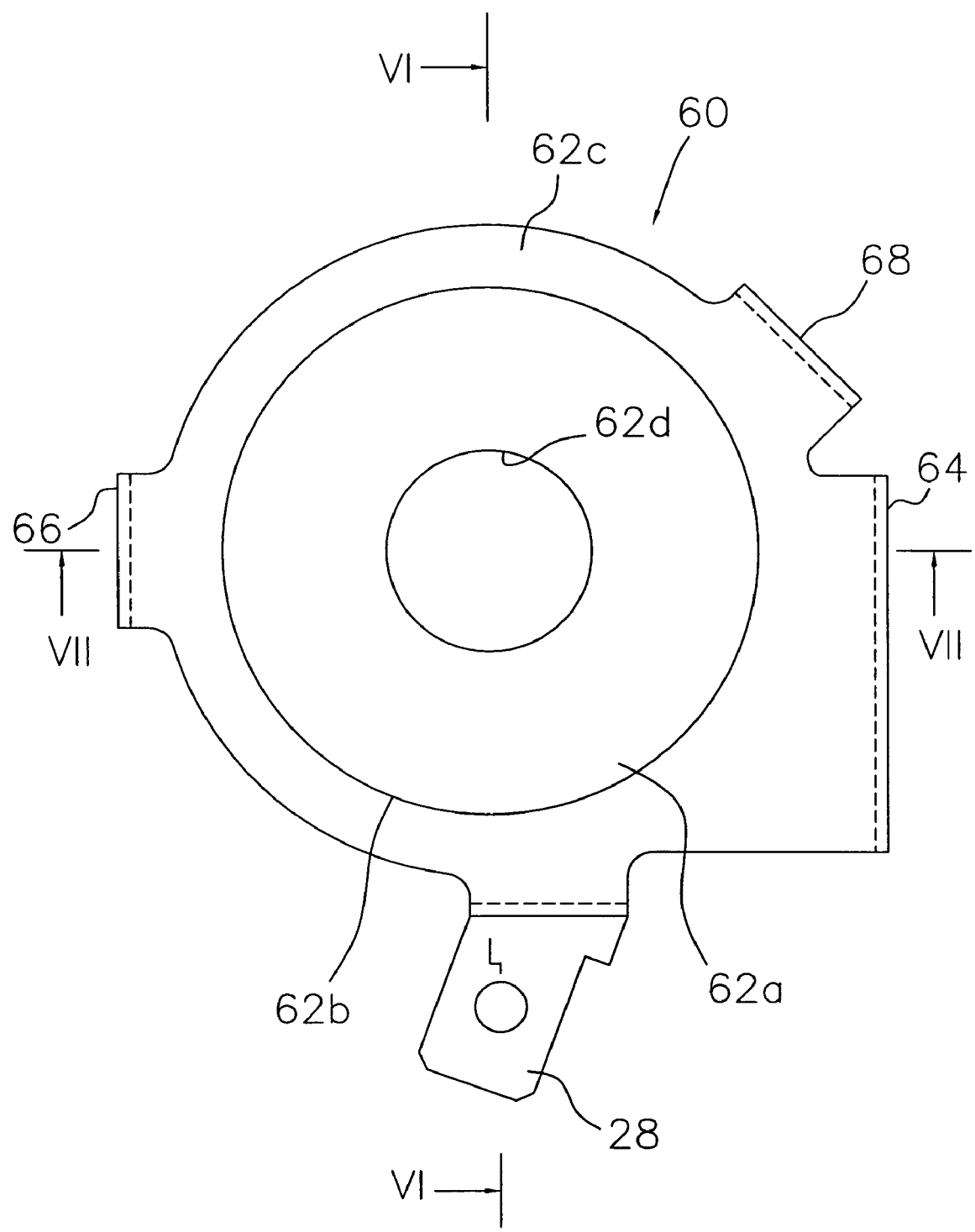
FIG. 5 is a side view of the adapter in accordance with the first embodiment of the present invention.
Figure 6:
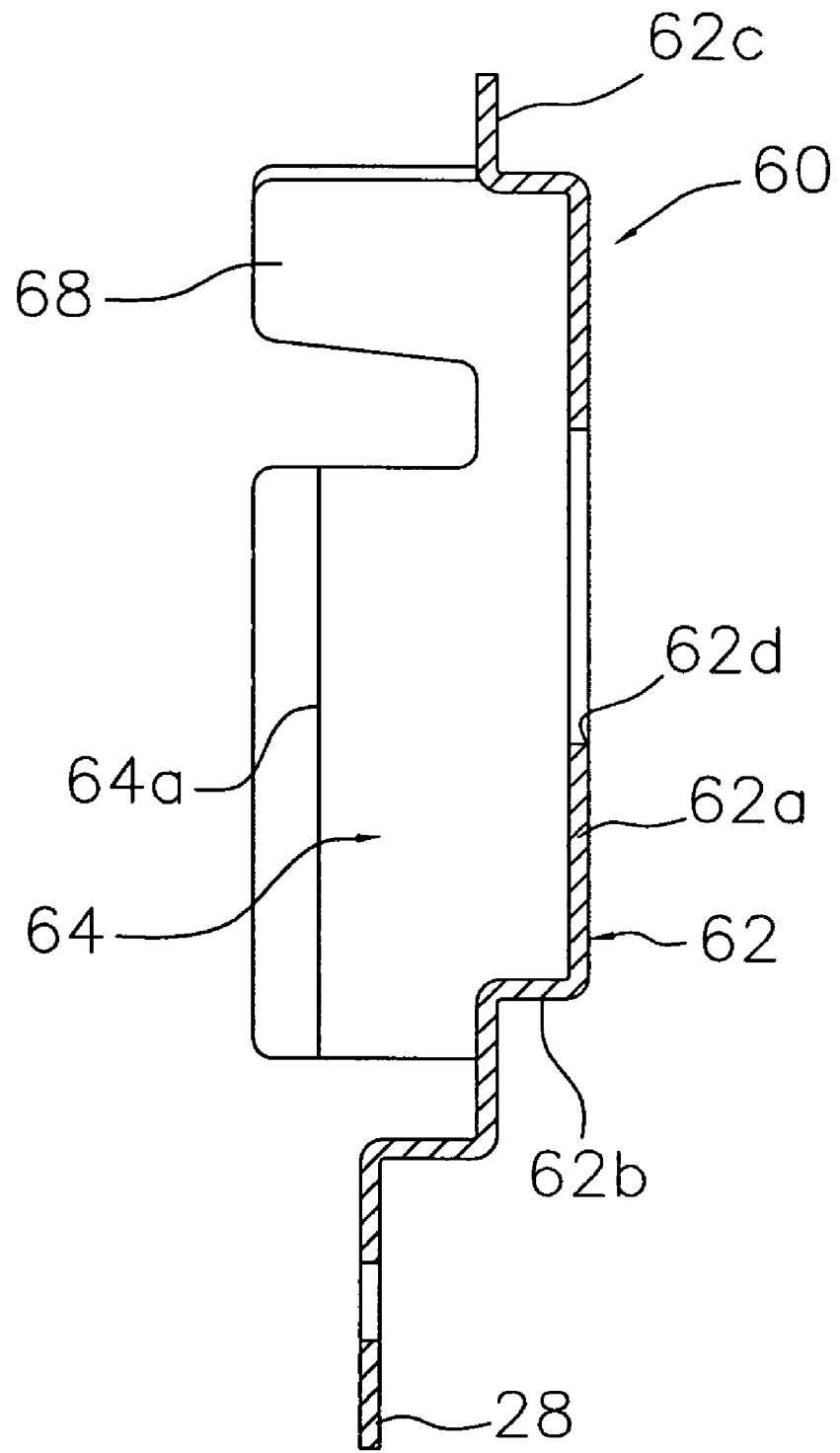
FIG. 6 is a cross section of the adaptor taken along the VI-VI line in FIG. 5 in accordance with the first embodiment of the present invention.

Further, as shown in FIG. 4, the outer peripheral face of the hub axle 15 is also formed with a chamfered portion 15e that extends the length of the second male threaded component 15c. The chamfered portion 15e prevents rotation of the generating mechanism 20 and the connector 22 with respect to the hub axle 15.

The hub axle 15 is non-rotatably fixed to the front fork 102a by fixing nuts 24 and 25 that thread onto the first male threaded components 15a and 15b.

With reference again to FIG. 2, the hub shell 18 has a main casing 31 and a pair of hub flanges 32 and 33. The main casing 31 is a cylindrical member extending in the axial direction of the hub axle 15, and has a bulging portion 31a on one side in the axial direction (to the right in FIG. 2) that extends radially outward further than the left side portion of the main casing 31. The hub flanges 32 and 33 are fixed to the outer peripheral face of the axial direction ends of the main casing 31 or integrally formed therewith. The hub flanges 32 and 33 are formed with a plurality of mounting holes 32a and 33a for mounting the inner ends of spokes 99 at equiangular spacing in the circumferential direction.

The hub shell 18 is fixed to the hub axle 15 by hub cones 16a and 17a (the inner race of the bearings 16 and 17) that thread onto the first male threaded components 15a and 15b, respectively, of the hub axle 15. These hub cones 16a and 17a are locked in position by lock nuts 35 and 36. The right lock nut 36 locks the hub cone 17a and also fixes the connector 22 to the hub axle 15.

The generating mechanism 20 is a claw-pole generator that includes a permanent magnet 41 and an inner fixing unit 42. The permanent magnet 41 is fixed around the inner peripheral face of the hub shell 18 and generally constitutes a rotor of the generating mechanism 20. The permanent magnet 41 being fixed to the hub shell 18 is further in electrical contact therewith. The hub shell 18 being in contact with the bearings (hub cones 16a and 17a and inner race of the bearings 16 and 17) is in electrical contact therewith. Further the bearings (hub cones 16a and 17a and inner race of the bearings 16 and 17)

are in electrical contact with the hub axle 15. As such, the permanent magnet 41 (the rotor of the generating mechanism 20) is in electrical contact with the hub axle 15 via the hub shell 18 and bearings.

The inner fixing unit 42 generally constitutes a stator of the generating mechanism 20. The inner fixing unit 42 is disposed within the inner peripheral part of the permanent magnet 41 and is non-rotatably fixed to the hub axle 15. More specifically, the permanent magnet 41 is fixedly attached to the inner face of the bulging portion 31a of the main casing 31 of the hub shell 18 and rotates with the hub shell 18 and the front wheel 106. The permanent magnet 41 preferably includes four magnet sections divided equidistantly in the peripheral direction. The permanent magnet 41 has alternating sections that are equidistantly spaced apart with alternating portions magnetized to north and south poles. The permanent magnet 41 encircles an outer periphery of a yoke 46 that is described in greater detail below.

As shown in FIG. 2, the inner fixing unit 42 has a ring-shaped coil 44 and the above mentioned yoke 46 that surrounds the outer periphery of the coil 44. The coil 44 and the yoke 46 are non-rotatably fixed to the hub axle 15 such that they are sandwiched by a pair of mounting nuts 48a and 48b that thread onto the second male threaded component 15c. The coil 44 and yoke 46 are positioned such that they are disposed within the bulging portion 31a in the axial direction.

The coil 44 is wound around a bobbin 50 in a conventional manner. The bobbin 50 has a cylindrical body 52 and first and second flanges 54a and 54b. The cylindrical body 52 and flanges 54a and 54b form an annular troth open radially outward into which the coil 44 is wound. The flanges 54a and 54b are formed at opposite axial ends of the body 52. A first end of the coil 44 is electrically connected to the hub axle 15, while the second end is electrically connected to the internal wiring 30.

The yoke 46 includes a plurality of sets of first laminated yokes 53a mounted so as to be fitted onto the first flange 54a of the bobbin 50, and a plurality of sets of second laminated yokes 53b similarly mounted so as to be fitted onto the second flange 54b of the bobbin 50. The first laminated yokes 53a and the second laminated yokes 53b generally encircle the bobbin 50 in an alternating manner.

As shown in FIGS. 3 and 4, the connector 22 is fixed to the hub axle along with the hub shell 18 by the lock nut 36, as mentioned above. The connector 22 is a fairly thick disk-shaped member, and has a first contact terminal 26 electrically connected via the internal wiring 30 to the second end of the coil 44. The first contact terminal 26 is, for example, a terminal connected to the power supply wire 13a of the headlamp 14. The connector 22 is formed with a pair of protrusions 22c and 22d that extend outward at off center positions with respect to the connector 22 and the hub axle 15. The protrusions 22c and 22d are formed on either peripheral side of the first contact terminal 26. In other words, the first contact terminal 26 is extends outward between the protrusions 22c and 22d. The connector 22 has a linear first flat face 22a oriented generally parallel to the hub axle 15. The first flat face 22a is formed on the protrusion 22c but extends beyond the protrusion 22c as indicated in FIG. 4. The connector 22 is also formed with a second flat face 22b disposed adjacent to the first flat face 22a but angularly offset therefrom. A center hole 22e is also formed in the connector 22. The center hole 22e includes a flat portion that is configured to engage the chamfered portion 15e of the hub axle 15. The flat portion of the center hole 22e ensures that the connector 22 is non-rotatably mounted to the hub axle 15.

As should be understood from the drawings and the description herein, the connector 22 made of non-conducting material, such as a plastic, polymer, composite or other non-conducting material. Within the connector 22, the first connection 26 is made of conductive material for transmission of generated electrical power. In contrast, the terminal adaptor 60 entirely made of a conductive material.

The terminal adapter 60 is provided as a second electrical terminal that with the first connection 26 of the connector 22 completes the circuitry to and from the generator hub 10. The terminal adapter 60 is in direct contact with the hub axle 15 and the frame 102 which serve as a ground for the generator hub 10. The terminal adapter 60 is formed, for example, by press molding a sheet of steel or similar metal that conducts electricity.

As shown in FIGS. 4 thru 7, the terminal adapter 60 has a mounting portion 62, a second contact terminal 28 and an engagement section that includes first, second and third locking portions 64, 66, and 68. However, the terminal adaptor 60 is a one-piece, unitary member preferably formed of a homogeneous material, such as a metal or metal alloy. The mounting portion 62 is oriented to contact in the axial direction an outer face of the lock nut 36. The second contact terminal 28 is formed integrally with the mounting portion 62. The first, second and third locking portions 64, 66, and 68 are formed integrally with the mounting portion 62 and are oriented such that the terminal adaptor 60 is locked in position with respect to the hub axle 15.

The mounting portion 62 is mounted on the hub axle 15 such that there is electrical conductivity therebetween. More specifically, the mounting portion 62 is electrically connected to the hub axle 15 by contact with the outer face of the lock nut 36 that threads onto the hub axle 15. The mounting portion 62 includes a disk portion 62a, a cover portion 62b and a washer portion 62c. The disk portion 62a has a contact surface that is in contact with an axial end face of the lock nut 36. The disk portion 62a also has a through hole 62d through which the hub axle 15 extends. The cover portion 62b extends from the outer peripheral face of the disk portion 62a toward the connector 22 so as to cover an outer peripheral part of the lock nut 36. The washer portion 62c is formed at the distal end of the cover portion 62b. The cover portion 62b is formed cylindrically so as to be capable of accommodating the lock nut 36 in its interior thereby at least partially covering the lock nut 36. The washer portion 62c is disposed across from the side face of the connector 22.

The first locking portion 64 is part of the engagement section shaped and configured to non-rotatably engage a portion of the connector 22 when in contact with the first flat face 22a of the connector 22.

Figure 7:
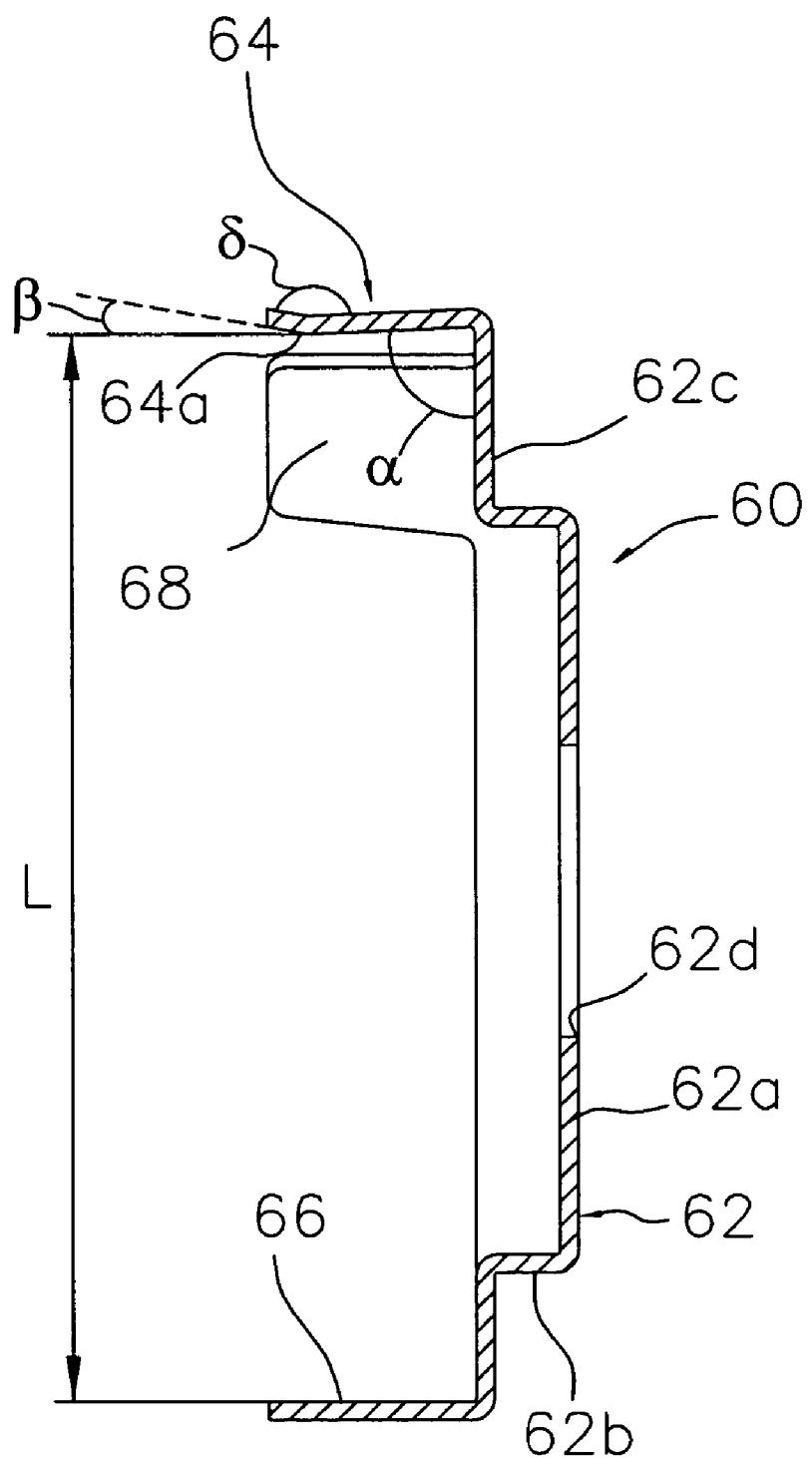
FIG. 7 is a cross section of the adaptor taken along the VII-VII line in FIG. 5 in accordance with the first embodiment of the present invention.

As shown in FIG. 7, the first locking portion 64 extends in a direction generally or almost perpendicular to and away from the washer portion 62c and away from the disk portion 62a. Preferably, the first locking portion 64 is bent first at an acute angle α that is approximately 85 degrees with respect to the disk portion 62a and also includes a second bent or angle portion 64a that is offset by an angle β that is approximately 10 degrees radially outward from the first locking portion 64. Therefore, the first locking portion 64 and the angle portion 64a define an angle γ that is approximately 165 degrees. The first locking portion 64 shaped in this way is arranged and configured to elastically latch onto the connector 22 when brought into contact with the first flat face 22a.

The second locking portion 66 is formed on a side of the terminal adaptor 60 opposite the first locking portion 64 with the through hole 62d roughly centered therebetween. The second locking portion 66 is formed such that it extends away from the washer portion 62c and almost parallel to the first locking portion 64, but more preferably, the second locking portion 66 extends at an angle approximately 90 degrees away from the washer portion 62c, and in the same direction as the first locking portion 64. The second locking portion 66 is disposed at a position where it can elastically contact and retain the connector 22 together with the first locking portion 64. More specifically, a distance L between the angle portion 64a of the first locking portion 64 and the inner face of the second locking portion 66 is slightly smaller than the outside diameter of the portion corresponding to the connector 22. Therefore, the first locking member 64 is configured to apply a biasing force on the connector 22 in combination with the second locking portion 66 contacting the connector 22.

Accordingly, the terminal adapter 60 is elastically latched, or grasped by the first locking portion 64 as well as being locked with respect to the connector 22 mounted non-rotatably to the hub axle 15. In other words, the angle α of the first locking portion 64 causes the first locking portion 64 to be biased into firm contact with the connector 22, locking the terminal adaptor 60 in position. More specifically, the first and second locking portions 64 and 66 constitute elastic latching components in addition to constituting locking portions with respect to the connector 22. The third locking portion 68 is a part of the engagement section capable of engaging the second flat face 22b. The terminal adapter 60 is locked with respect to the hub axle 15 and mounted non-rotatably to the connector 22 by the first and third locking portions 64 and 68.

The second contact terminal 28 is a terminal that is preferably connected to the ground wire 13b of the headlamp 14. As shown in FIG. 4, the second contact terminal 28 is shaped so as to be aligned with the first contact terminal 26. More specifically, the second contact terminal 28 extends in an axial direction away from the washer portion 62c and then bent to extend radially outward away from the outer face of the connector 22 so as to be lined up with but be a suitable distance away from the first contact terminal 26. The second contact terminal 28 also extends in a different direction from the first contact terminal 26. More specifically, as shown in FIG. 3, the second contact terminal 28 extends such that its distal end is angled away from the first contact terminal 26. If the two contact terminals are too close together, they will be compact and attractive in appearance, but it will be difficult to connect the power supply wire or the ground wire. In view of this, in the first embodiment, the distal end of the second contact terminal 28 is disposed away from the first contact terminal 26, so that even if the two contact terminals 26 and 28 are moved closer together in order to achieve a more compact size and a more attractive appearance, the first contact terminal 26 will still be readily distinguishable from the second contact terminal 28, and it will be easy to connect the power supply wire 13a or the ground wire 13b.

With a generator hub 10 configured as described above, the terminal adapter 60 is mounted as dictated by the specifications and application. For instance, variations of the terminal adapter 60 may be required when mounted to a generator hub used for a sports bicycle. Further, variations of the terminal adapter 60 may be required if mounted to a generator hub to be exported to Europe. Further, the terminal adapter 60 can be mounted to a location on the bicycle 101 other than the generator hub 10 if used for other specifications or applications. Also, in retrofitting an electrical shifter, a controller for such a shifter, or another such electrical device, if the power supply needs to be a two-wire type of generator hub having two contact terminals, this can be easily accomplished merely by adding the terminal adapter 60.

The terminal adapter 60 can be installed in a state in which the assembly of the generator hub 10 is complete and the lock nuts 35 and 36 have been tightened. The mounting of the terminal adapter 60 is simply accomplished. More specifically, the terminal adapter 60 is mounted from the outer face of the lock nut 36 so as to cover the lock nut 36, and the mounting is completed by elastically latching to the outer peripheral face of the connector 22 with the first to third locking portions 64, 66, and 68.

Therefore, when the terminal adapter 60 is retrofitted, the power supply wire 13a is removed from the first contact terminal 26, the fixing nuts 24 and 25 are removed, and the generator hub 10 is removed from the front fork 102a along with the front wheel 106. The terminal adapter 60 is then mounted to the connector 22 from the outer face of the lock nut 36 of the generator hub 10. The generator hub 10 is mounted to the front fork 102a, the power supply wire 13a is connected to the first contact terminal 26, and the ground wire 13b is connected to the second contact terminal 28.

With a terminal adapter 60 designed as described above, the terminal adapter 60 is disposed toward the outer side of the lock nut 36 and the terminal adapter 60 has the second contact terminal 28 mounted to the hub axle 15 after the connector 22 has been fixed to the hub axle 15. Accordingly, the second contact terminal 28 can be easily added to the connector 22, allowing a connector 22 having only one first contact terminal 26 to be easily changed to a connector 22 having two contact terminals 26 and 28. This reduces the number of types of connectors 22 necessary, and simplifies the manufacture of the connector 22 and the assembly of the generator hub 10. Also, since the terminal adapter 60 may be added in the event that an electrical device requiring two contact terminals 26 and 28 is subsequently added, retrofitting of an electrical device is easier.

Also, since the terminal adapter 60 is locked with respect to the hub axle 15, the positional relationship between the second contact terminal 28 and the first contact terminal 26 provided to the connector 22 is also fixed. Therefore, in changing a connector 22 having just one contact terminal 26 to a connector 22 having two contact terminals 26 and 28, the two contact terminals 26 and 28 can be aligned, and the wiring for the two contact terminals 26 and 28 can be installed more easily.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Second Embodiment

Figure 8:
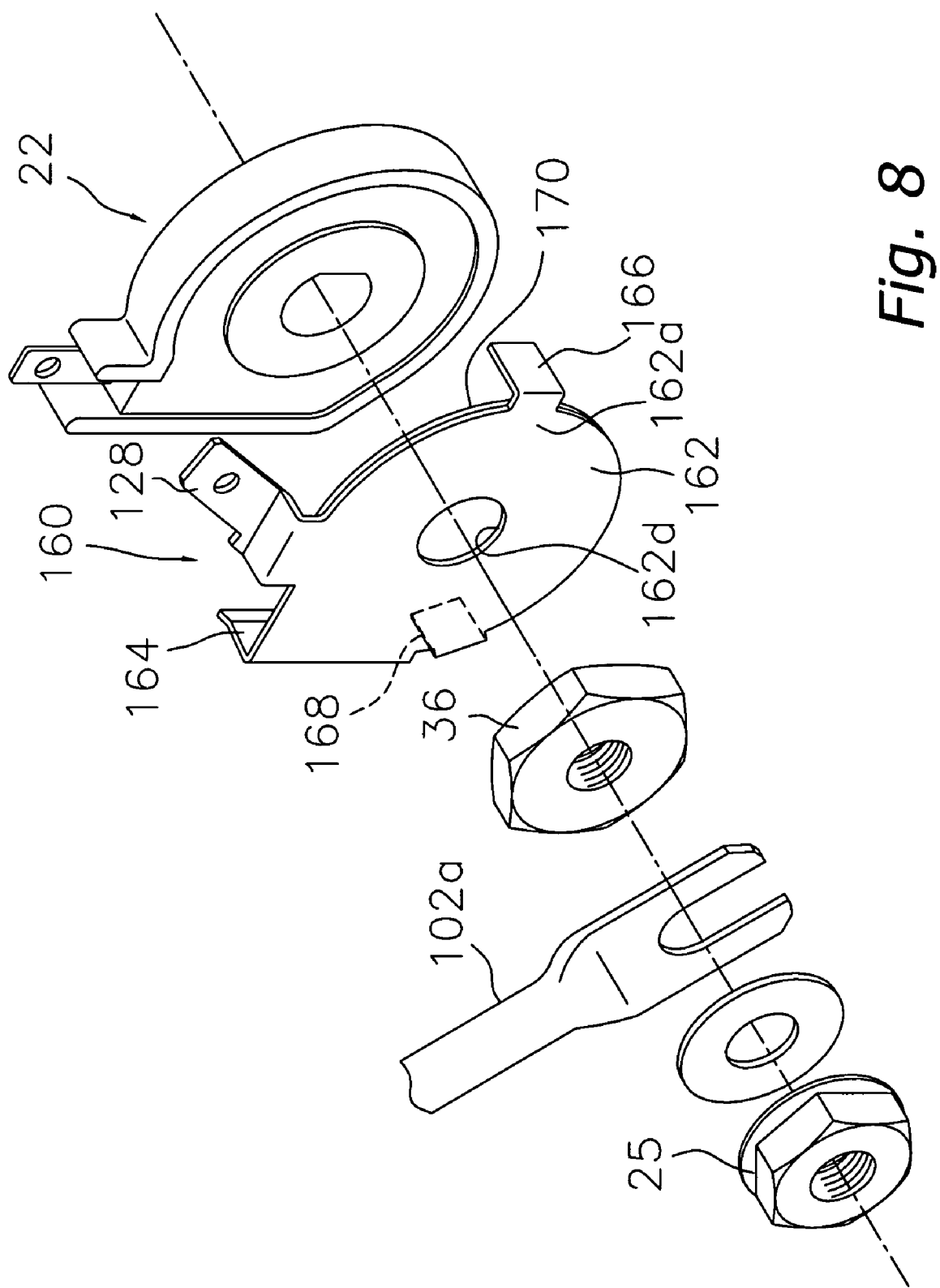
FIG. 8 is an exploded view of a portion of a hub generator showing a portion of a hub axel, a connector and an adapter in accordance with a second embodiment of the present invention.

Referring now to FIG. 8, a connector configuration in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the terminal adapter 60 was mounted on an outer face of the lock nut 36 in order to facilitate easy installation. However, as shown in FIG. 8, a terminal adaptor 160 may be disposed between the lock nut 36 and the connector 22.

The terminal adaptor 160 is formed, for example, by press molding a sheet of steel or other similar material that is a conductor. The terminal adapter 160 includes a mounting portion 162, a second contact terminal 128 and first, second and third locking portions 164, 166, and 168. The mounting portion 162 is configured to contact an axial direction inner face of the lock nut 36. The second contact terminal 128 is formed integrally with the mounting portion 162. Further, the first, second and third locking portions 164, 166, and 168 are formed integrally with the mounting portion 162 and engage the connector 22 thereby locking the terminal adaptor 160 in place with respect to the hub axle 15.

The mounting portion 162 is electrically mounted to the hub axle 15. More specifically, it is electrically connected to the hub axle 15 by being brought into contact with the inner face of the lock nut 36 that threads onto the hub axle 15. The mounting portion 162 has a disk portion 162a that is in contact with the lock nut 36 and a through hole 162d through which the hub axle 15 passes. A washer member 170 made of a synthetic resin, for example, is disposed between the disk portion 162a and the connector 22 providing insulation therebetween. The washer member 170 may be formed integrally with or separately from the terminal adapter 160.

The first, second and third locking portions 164, 166, and 168 and the second contact terminal 128 are generally the same as the first, second and third locking portions 64, 66, and 68 and the second contact terminal 28 in the above described first embodiment, therefore description of these elements will not be provided to avoid repetition.

The terminal adapter 160 of the second embodiment is fixed to the hub axle 15 along with the connector 22 by the lock nut 36. Accordingly, even if the hub axle 15 is removed from the front fork 102a, the terminal adapter 160 will not come off the connector 22. Therefore, the product can be shipped with the terminal adapter 160 already installed on the generator hub 10.

Other Embodiments (a) In the above embodiments, the examples given were of a terminal adapter mounted to the generator hub on a front wheel, but can also be similarly mounted to the generator hub of a rear wheel.

(b) In the above embodiments, the first and second contact terminals were angularly offset from one another extending is slightly different directions, but may instead be oriented to extend in the same direction parallel to one another. In this case, the wiring may be changed to dedicated two-wire use, allowing the power supply wire and ground wire to be connected to the first and second contact terminals at the same time.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A generator hub adapter, for a bicycle generator hub, where the generator hub includes a hub axle, a generator stator, a connector, a hub shell and a generator rotor, the generator stator being mounted to the hub axle, the connector being mounted on the hub axle proximate an axial end of the hub axle by a nut member, the connector having a first contact terminal electrically connected to the generator stator, the hub shell being rotatably mounted to the hub axle and the generator rotor being fixed to the hub shell for rotation therewith, the generator stator being electrically connected to the hub axle and the nut member, the generator hub adaptor comprising:

a mounting portion having a contact surface that is dimensioned and arranged to contact an axial outer face of the nut member, the mounting portion being electrically connectable to the nut member via contact between the contact surface and the axial outer face, the mounting portion further being dimensioned and arranged to mount to the hub axle adjacent to the nut member; and;

a second contact terminal formed integrally with the mounting portion as a single unitary electrically conducting element, the second contact terminal being in electrical connection to the nut member via the contact surface, the mounting portion including a disk portion and a cover portion, the disk portion having defined thereon the contact surface that contacts the nut member, the disk portion being formed with a through hole dimensioned and arranged to receive the hub axle, and the cover portion extending in an axial direction from an outer periphery of the disk portion so as to cover of an outer periphery of the nut member.

2. The generator hub adapter according to claim 1, further comprising:

an engagement section that is integrally and unitarily formed with the mounting portion and is engagable with the connector.

3. A generator hub adapter for a bicycle generator hub, where the generator hub includes a hub axle, a generator stator, a connector, a hub shell and a generator rotor, the generator stator being mounted to the hub axle, the connector being mounted on the hub axle proximate an axial end of the hub axle by a nut member, the connector having a first contact terminal electrically connected to the generator stator, the hub shell being rotatably mounted to the hub axle and the generator rotor being fixed to the hub shell for rotation therewith, the generator stator being electrically connected to the hub axle and the nut member, the generator hub adaptor comprising:

a mounting portion dimensioned and arranged for mounting on the hub axle and electrical connection to the hub axle;

an engagement section that is formed integrally with the mounting portion and is engagable with the connector for mechanical attachment thereto; and a second contact terminal formed integrally as a single unitary electrically conducting element with the mounting portion and the engagement section, the engagement section including at least a first and second locking portion that are non-rotatably engagable with the connector, with the connector non-rotatably mounted to the hub axle.

4. The generator hub adapter according to, claim 3, wherein
the mounting portion is dimensioned and arranged for installation between the nut member and the connector.

5. The generator hub adapter according to claim 3, wherein the mounting portion is dimensioned and arranged for installation adjacent to the nut member, with the nut member installed adjacent to the connector.

6. The generator hub adapter according to claim 3, wherein the first locking portion is formed at an angle with respect to the mounting portion, the angle being approximately a right angle, the first locking portion dimensioned and arranged so as to apply a biasing contact force against an outer flat face of the connector.

7. The generator hub adapter according to claim 3, wherein the generator hub adapter is dimensioned and arranged such that a distal end of the second contact terminal is alignable with the first contact terminal.

8. The generator hub adapter according to claim 3, wherein the generator hub adapter is dimensioned and arranged such that a distal end of the second contact terminal is angularly offset from the first contact terminal with the generator hub adaptor installed on the hub axle.

9. A generator hub adapter for a bicycle generator hub, where the generator hub includes a hub axle, a generator stator, a connector, a hub shell and a generator rotor, the generator stator being mounted to the hub axle, the connector being mounted on the hub axle proximate an axial end of the hub axle by a nut member, the connector having a first contact terminal electrically connected to the generator stator, the hub shell being rotatably mounted to the hub axle and the generator rotor being fixed to the hub shell for rotation therewith, the generator stator being electrically connected to the hub axle and the nut member, the generator hub adaptor comprising:
a mounting portion dimensioned and arranged for mounting on the hub axle and electrical connection to the hub axle;
an engagement section that is formed integrally with the mounting portion and is engagable with the connector for mechanical attachment thereto; and
a second contact terminal formed integrally as a single unitary electrically conducting element with the mounting portion and the engagement section,
the engagement section including first and second locking portions that are arranged and configured to impart a biasing force that elastically holds the connector with the generator hub adaptor installed on the hub axle.

10. A generator hub adapter for a bicycle generator hub, where the generator hub includes a hub axle, a generator stator, a connector, a hub shell and a generator rotor, the generator stator being mounted to the hub axle, the connector being mounted on the hub axle proximate an axial end of the hub axle by a nut member, the connector having a first contact terminal electrically connected to the generator stator, the hub shell being rotatably mounted to the hub axle and the generator stator being fixed to the hub shell for rotation therewith, the generator rotor being electrically connected to the hub axle and the nut member, the generator hub adaptor comprising:
a mounting portion having a cover portion and a disk portion, the disk portion having a contact surface that is dimensioned and arranged to contact an axial outer face of the nut member, the mounting portion being electrically connectable to the nut member via contact between the contact surface and the axial outer face, the mounting portion further being dimensioned and arranged to mount to the hub axle adjacent to the nut member, the disk portion being formed with a through hole dimensioned and arranged to receive the hub axle, and the cover portion extending in an axial direction from an outer periphery of the disk portion so as to cover of an outer periphery of the nut member; and
a second contact terminal formed integrally with the mounting portion, the second contact terminal being arranged and configured for electrical connection to the nut member via the contact surface.

11. A generator hub adapter for a bicycle generator hub, where the generator hub includes a hub axle, a generator stator, a connector, a hub shell and a generator rotor, the generator stator being mounted to the hub axle, the connector being mounted on the hub axle proximate an axial end of the hub axle by a nut member, the connector having a first contact terminal electrically connected to the generator stator, the hub shell being rotatably mounted to the hub axle and the generator rotor being fixed to the hub shell for rotation therewith, the generator stator being electrically connected to the hub axle and the nut member, the generator hub adaptor comprising:
a mounting portion dimensioned and arranged for mounting on the hub axle and electrical connection to the hub axle;
an engagement section that is formed integrally with the mounting portion and is engagable with the connector for mechanical attachment thereto, the engagement section comprises at least a first and second locking portion that are non-rotatably engagable with the connector, with the connector non-rotatably mounted to the hub axle; and
a second contact terminal formed integrally with the mounting portion.

12. The generator hub adapter according to claim 11, wherein
the first locking portion is formed at an angle with respect to the mounting portion, the angle being approximately a right angle, the first locking portion dimensioned and arranged so as to apply a biasing contact force against an outer flat face of the connector.

13. A generator hub adapter for a bicycle generator hub, where the generator hub includes a hub axle, a generator stator, a connector, a hub shell and a generator rotor, the generator stator being mounted to the hub axle, the connector being mounted on the hub axle proximate an axial end of the hub axle by a nut member, the connector having a first contact terminal electrically connected to the generator stator, the hub shell being rotatably mounted to the hub axle and the generator rotor being fixed to the hub shell for rotation therewith, the generator stator being electrically connected to the hub axle and the nut member, the generator hub adaptor comprising:
a mounting portion dimensioned and arranged for mounting on the hub axle and electrical connection to the hub axle;
an engagement section that is formed integrally with the mounting portion and is engagable with the connector for mechanical attachment thereto, the engagement section including first and second locking portions that are arranged and configured to impart a biasing force that elastically holds the connector with the generator hub adaptor installed on the hub axle; and a second contact terminal formed integrally with the mounting portion.

* * * * *